UNITED STATES PATENT OFFICE.

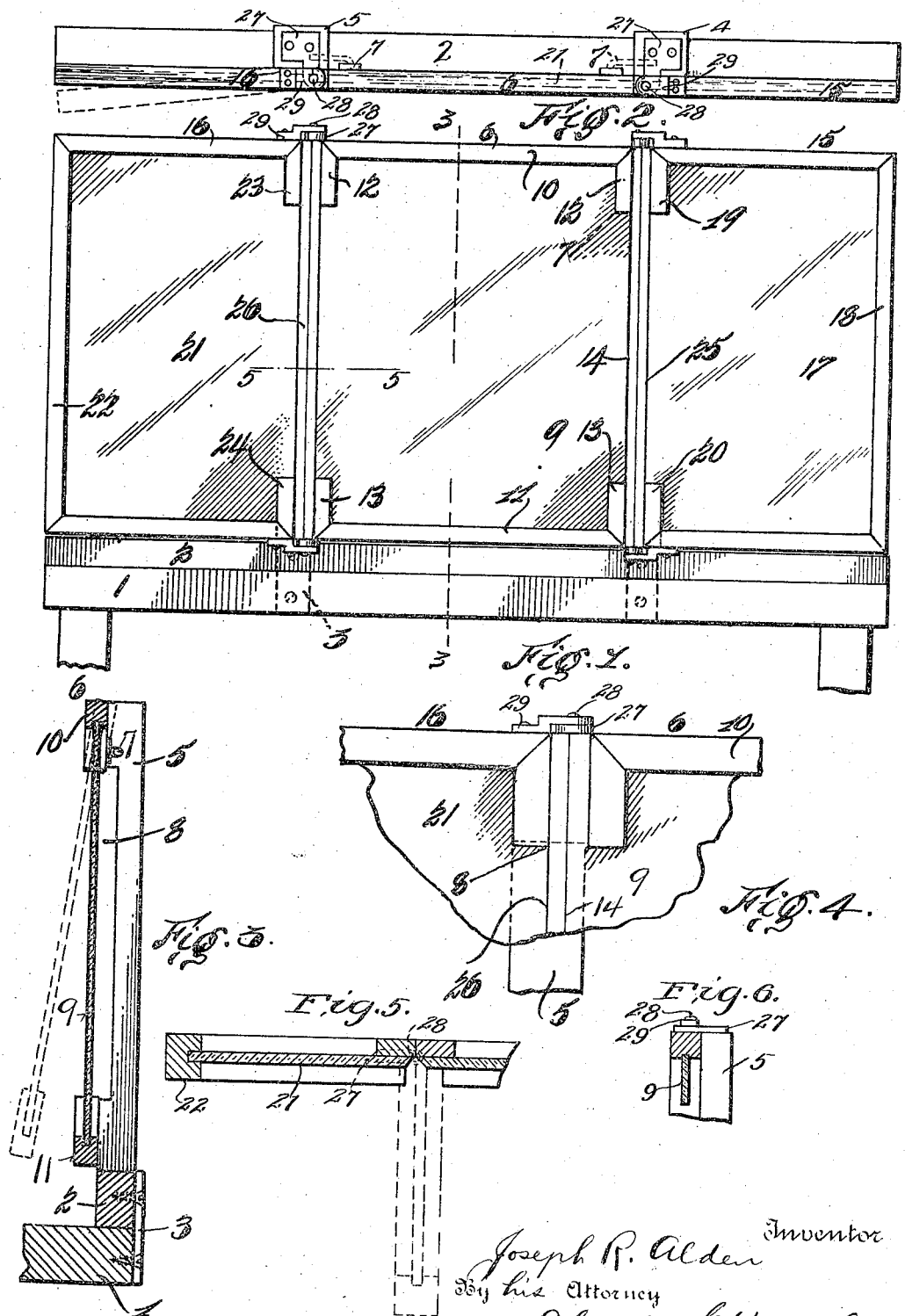

JOSEPH R. ALDEN, OF GRAND RAPIDS, MICHIGAN.

MIRROR FOR DRESSING-TABLES AND THE LIKE.

1,242,631. Specification of Letters Patent. Patented Oct. 9, 1917.

Application filed July 11, 1916. Serial No. 108,593.

*To all whom it may concern:*

Be it known that I, JOSEPH R. ALDEN, a citizen of the United States, and a resident of the city of Grand Rapids, in the county of Kent and State of Michigan, have invented certain new and useful Improvements in Mirrors for Dressing-Tables and the like, of which the following is a specification.

The invention relates to mirrors suitable for ladies' dressing tables, although the invention is not necessarily limited to that particular use.

The invention relates to mirrors of the folding type in which two or more mirror sections are adapted to be placed in different angular relations one to the other, whereby a person may, by observing the cross reflections in the mirror sections, see portions of the head, etc., which can not be seen by a single direct reflection. Such mirrors usually form part of ladies' dressing tables. The object of my present invention is to provide a mirror of this character in which the view will not be obstructed or broken. In the present device the mirror sections present an unbroken or uninterrupted reflecting surface from one side to the other. The side and middle mirror sections have their reflecting surfaces meeting edge to edge and there is no frame structure at these meeting edges to obstruct the continuity of the view. The moving or swinging mirror sections turn on axes which aline substantially with the meeting edges of the mirror sections, so that these edges will not separate and leave an open gap when the mirror sections are moved to different relative angles. The view obtained is unbroken just as when observing objects in one long mirror, but at the same time the advantages of angular mirrors are obtained.

In the drawing forming part of this application,

Figure 1 is an elevation of the upper part of a dressing table, showing my invention applied thereto, Fig. 2 is a plan view of the mirror, Fig. 3 is a sectional view, taken on the line 3—3 of Fig. 1.

Fig. 4 is a fragmentary view on an enlarged scale of a portion of the device in elevation.

Fig. 5 is a section taken on the line 5—5 of Fig. 1;

Fig. 6 is a fragmentary view of the parts shown in Fig. 3, showing the upper hinge members for the side frames.

I have shown the top 1 of an ordinary dressing table, and the mirror sections as mounted along the rear edge of the table top. The lower rail or frame member 2 may be secured to the table by cleats 3 in the usual manner.

There are posts 4, 5, rising up from the rail 2 and they are adapted to support the several mirror sections in place. The middle mirror section, 6, may be stationary, or, as shown may be arranged to swing on a horizontal axis so that it may be tilted when desired. For this purpose I have provided a pintle 7 at each side and toward the top of the middle mirror section and said pintles turn in the posts 4, 5. By means of this arrangement it is possible to swing the lower end of the middle section 6 forwardly or to leave it in a perpendicular position. This feature is not new, *per se*, but when used in conjunction with the other features of my invention, it adapts the mirror to meet all requirements.

The middle mirror section 6 comprises the glass 9, and the frame portions 10 and 11 at the top and the bottom thereof. The frame preferably extends down from the top at 12 on each side for a short distance and upwardly from the bottom at 13 on each side. But for the greater part of its length the front of the glass 9 is unobstructed by the frame at the side edges 14. The middle mirror section is adapted to reflect right out to its side edges.

There are side sections 15 and 16 at opposite sides of the middle mirror section. The side section 15 comprises the glass 17 having a frame 18 around three of its sides and preferably the frame extends downward at 19 and upward at 20; but the greater part of the left hand edge of the glass 17 is unobstructed by the frame 18.

The side section 16 comprises the glass 21, a frame 22 around three sides thereof and the extensions 23, 24; and the glass 21 is unobstructed by the frame along its right edge.

The side sections 15, 16, are so hinged that their axes will coincide or nearly coincide with their edges 25 and 26, respectively. There are brackets 27 at the top and bottom of the posts 4, 5, and there is a hinge connection at 28 between each of these brackets and the frame extensions 19, 20, 23, 24. The axes of these hinges are substantially in line with the edges 25, 26, of the side sections, 15, 16.

The three sections may all be arranged to lie in a common plane and the several glasses 9, 17 and 21 will then appear as if they were all one; that is, they will serve as would a single mirror equal in size to all three. When it is desired to place the sections in position for viewing by double reflection the side or back of the head or body, then the side sections 15, 16, are swung on their hinges to any desired angle in relation to the middle section. But when the side sections are placed at any angle to the middle section the adjacent edges of the glasses of the several sections will remain juxtaposed and form a practically continuous reflecting surface, unobstructed by any intermediate frame structure. The edge 25 of the right section will lie close to the edge 14 of the middle section and the edge 26 of the left section will lie close to the left edge of the middle section. The reflections between the sections 6, 15 and 16 will extend right to the meeting edges of the glasses 9, 17 and 21 and these edges always meet, regardless of the angles at which the side sections are placed. Usually the view is obstructed by portions of the frame extending down the edges of both the side and middle glasses. With the present device, however, it is not necessary to move about to see parts which would ordinarily be obstructed by the intermediate frame parts.

The present device is not only simple and efficient but its appearance as a whole is a decided improvement over prior sectional mirrors.

Generally the middle section 6 will be perpendicular when the side sections are turned at an angle to the middle section and the middle section will be tilted on its pintles 7 only when the sections are all in the same plane.

Having described my invention, what I claim is:

1. A device of the class described, comprising a support, a plurality of mirror sections mounted thereon and having frame portions, said mirror sections having their reflecting portions arranged edge to edge and having the frame portions omitted for at least a substantial portion of the length of the meeting edges whereby the mirror sections will present a substantially continuous reflecting surface, at least one of said mirror sections being hinged to swing on an axis corresponding substantially with the adjacent edges of said sections, whereby said mirror sections may be placed at different relative angles and form a substantially continuous reflecting surface.

2. A device of the class described comprising a support, a plurality of mirror sections mounted thereon and including a middle mirror section and side sections at each side thereof, said sections having frame portions, said side mirror sections having their reflecting portions arranged edge to edge with said middle mirror section, the several sections having the frame portions omitted for at least a substantial portion of the length of their respective meeting edges whereby the mirror sections will present a substantially continuous reflecting surface, said side mirror sections being hinged at top and bottom to swing on axes corresponding substantially with the respective meeting edges of said middle and side sections, whereby said mirror sections may be placed at different relative angles to each other and form a substantially continuous reflecting surface.

3. A device of the class described comprising a support, a middle mirror section comprising a glass, a frame therefor comprising top and bottom members and members extending inwardly along the side edges of said glass a short distance only, whereby the greater part of the side edges of said glass are unobstructed, said middle section being arranged to swing on a horizontal axis, side sections at opposite sides of said middle section, each comprising a glass and a frame extending around three sides thereof and extending inwardly a short distance only at the remaining side of the glass, whereby the greater portion of one edge of said glass is unobstructed, and hinges on which said side mirror sections turn, arranged in line with said unobstructed side edges.

Signed at the city of Grand Rapids, in the county of Kent and State of Michigan, this 6th day of July, 1916.

JOSEPH R. ALDEN.